Jan. 11, 1949.  A. D. BRUNDAGE  2,458,677
VISOR
Filed April 18, 1945
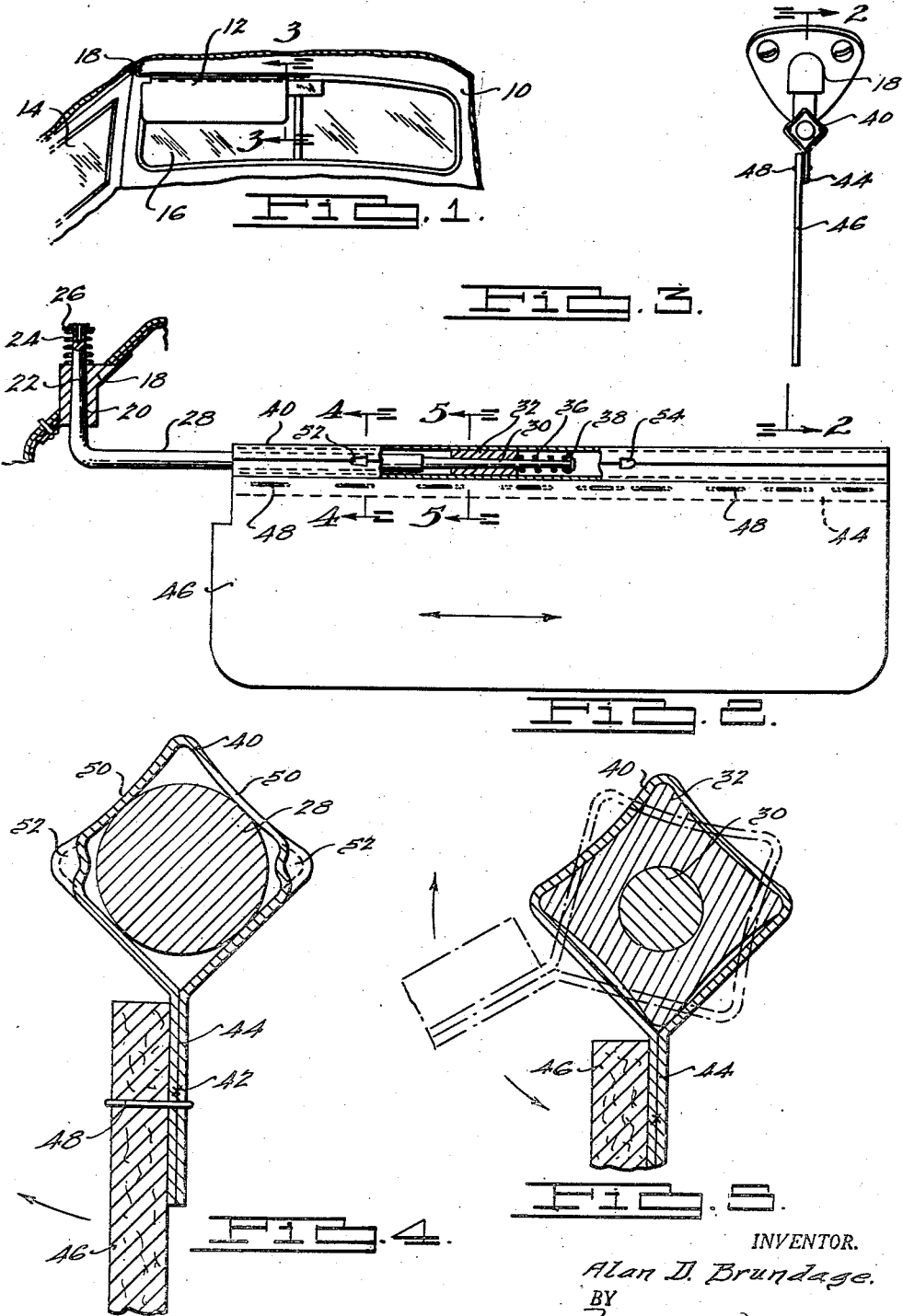
INVENTOR.
Alan D. Brundage.
BY
Maxwell K. Murphy
ATTORNEY.

UNITED STATES PATENT OFFICE 2,458,677

VISOR

Alan D. Brundage, Detroit, Mich., assignor to F. L. Jacobs Co., Detroit, Mich., a corporation of Michigan Application April 18, 1945, Serial No. 589,000

2 Claims. (Cl. 296—97)

This invention relates to a visor and is illustrated as embodied in a visor of the type commonly used in automobiles for protecting the occupants against sun glare.

It is an object of the present invention to provide a visor which may be pivotally supported for swinging movement into one of many positions and to provide means for permitting sliding movement of the visor relative to its support.

Another object of the invention is to provide an inexpensive structure which is economical to manufacture and one which is frictionally held in adjusted position yet freely movable from one position to another.

A further object of the invention is to provide means for compensating for wear of the parts with take up means for maintaining a predetermined frictional drag on relatively movable parts.

Other objects and advantages of the invention will more fully appear from the following description taken in connection with the accompanying drawings in which:

Fig. 1 is a perspective view of the inner front end portion of an automobile showing an application of the visor;

Fig. 2 is an enlarged side elevational view of the visor, parts being broken away and in section;

Fig. 3 is an end view of Fig. 2;

Fig. 4 is an enlarged sectional view taken on line 4—4 of Fig. 2; and

Fig. 5 is an enlarged sectional view taken on line 5—5 of Fig. 2 and illustrating, in dotted lines, a turned position of visor relative to its supporting rod.

Referring to the drawings I have illustrated the invention as applied to the body of an automobile 10 for positioning the visor 12 between a side window 14 and a windshield 16.

The visor assembly is supported in a bracket 18 which is secured to the body of the automobile. The bracket is provided with a tapered opening 20 therethrough which receives a correspondingly tapered rod 22. One end of the rod 22 extends beyond the edge of the bracket and a coil spring 24 has its opposite ends in abutting relation with the edge of the bracket and a washer 26 secured to the end of a rod by peening over the end of the rod on the washer. The spring 24 urges the tapered rod into frictional engagement with the opening in the bracket 18 and takes up for wear.

The opposite end of the rod 22 is bent at right angles forming an arm which may be referred to as a bearing portion 28. The free end of the bearing portion 28 has a reduced shank 30. The shank 30 is round and tapered toward the end thereof. A slide block 32, square in cross section, has a tapered opening extending axially through the block which receives the tapered shank 30. The diameters of the opening and the shank 30 are predetermined such that when assembled, the block 32 frictionally fits the shank 30 substantially mid-way thereof. A coil spring 36 has its opposite ends in abutting relation with the outer end of the block 32 and a washer 38 secured to the end of the shank by peening over the outer end of the shank on the washer. The spring 36 urges the block 32 into frictional engagement with the shank 30 and takes up for any wear which might be caused by the relative rotation between the block 32 and shank 30.

Slidably mounted on the bearing portion 28 of the rod is a tube 40 formed from a flat sheet of material reversely bent upon itself to form a square tubular portion through which the rod and block 32 extend with the free edges of the sheet in overlapping relation and welded together as at 42 to form an attaching flange 44. A panel 46 is secured to the flange 44 by staples 48.

The tube 40 has two of its sides bowed inwardly as shown at 50 and are adapted to resiliently engage the outer surface of the bearing portion 28 of the rod. This provides frictional resistance between the bearing portion 28 and tube 40 for holding the panel in a longitudinally adjusted position. When the panel 46 is moved to an up or down position the block 32 is turned therewith and due to the taper of the shank 30 and opening in the block 32 and the compression spring 36, there is a frictional drag which holds the panel 46 in any adjusted position.

After the rod has been assembled in the tube 40, depressed portions 52 and 54 are formed in opposite corners of the tube. The depressions 52 serving as stops to limit the outward position of the panel 46 relative to the rod by engagement with one end of the block 32. The depressions 54 serve as tops to limit the inward position of the panel 46 relative to the rod by engagement with the opposite end of the block 32. The panel may be covered by upholstery material if desired to add to its appearance.

From the above it will be understood that I have provided a visor having a panel which may be positioned adjacent and parallel to the roof of an automobile. The panel may be turned down over the upper portion of the windshield, as shown in Fig. 1 or it may be turned in the bracket 18 to cover the upper portion of the left window. The panel may be slid longitudinally on the rod within the limits of the stops 52 and 54.

Due to the tapered frictional engaging surfaces, both on the rod 22 and shank 30, the parts are always held in tight engagement regardless of wear. There is always maintained a frictional drag sufficient to hold the parts in adjusted position.

It will be understood that various changes including the size shape and arrangement of parts may be made without departing from the spirit of my invention and it is not my intention to limit its scope other than by the terms of the appended claims.

I claim:

1. In a slidable visor, a cylindrical shaped visor supporting rod, a frustro-conical shaped end portion carried by said rod, a block substantially square in external cross-section having a frustro-conical shaped bore frictionally engaging said end portion to yieldably resist turning movement of the block on the frustro-conical end portion, a visor supporting tube formed of resilient material embracing the cylindrical shaped portion of said rod and said block, said tube being substantially square in cross-section and with the sides thereof lying substantially in engagement with the surfaces of the block, said tube having opposite walls thereof spaced from each other a distance substantially equal to the diameter of the cylindrical portion of said rod, some of the side walls of said tube being bowed inwardly to frictionally and resiliently engage the periphery of the cylindrical portion of the rod to yieldably resist sliding movement of the tube relative to the rod, and a visor panel carried by said tube.

2. In a slidable visor, a cylindrical shaped visor supporting rod, a frustro-conical shaped end portion carried by said rod, a block substantially square in external cross-section having a frustro-conical shaped bore frictionally engaging said end portion to yieldably resist turning movement of the block on the frustro-conical end portion, a visor supporting tube formed of resilient material embracing the cylindrical shaped portion of said rod and said block, said tube being substantially square in cross-section and with the sides thereof lying substantially in engagement with the surfaces of the block, said tube having opposite walls thereof spaced from each other a distance substantially equal to the diameter of the cylindrical portion of said rod, some of the side walls of said tube being bowed inwardly to frictionally and resiliently engage the periphery of the cylindrical portion of the rod to yieldably resist sliding movement of the tube relative to the rod, a visor panel carried by said tube, and opposite corners of said tube being bent inwardly to provide abutments limiting sliding movement of the tube relative to said block.

ALAN D. BRUNDAGE.

REFERENCES CITED

The following references are of record in the file of this patent:

UNITED STATES PATENTS

| Number | Name | Date |
| --- | --- | --- |
| 2,299,775 | Westrope | Oct. 27, 1942 |
| 2,360,183 | Westrope | Oct. 10, 1944 |